Nov. 7, 1944.  D. T. HALL  2,362,268
GRAB DEVICE
Filed June 19, 1944   2 Sheets-Sheet 1

Inventor
Donald T. Hall,
By Ritter, Mechlin & Miner
his Attorneys

Nov. 7, 1944.  D. T. HALL  2,362,268
GRAB DEVICE
Filed June 19, 1944   2 Sheets-Sheet 2
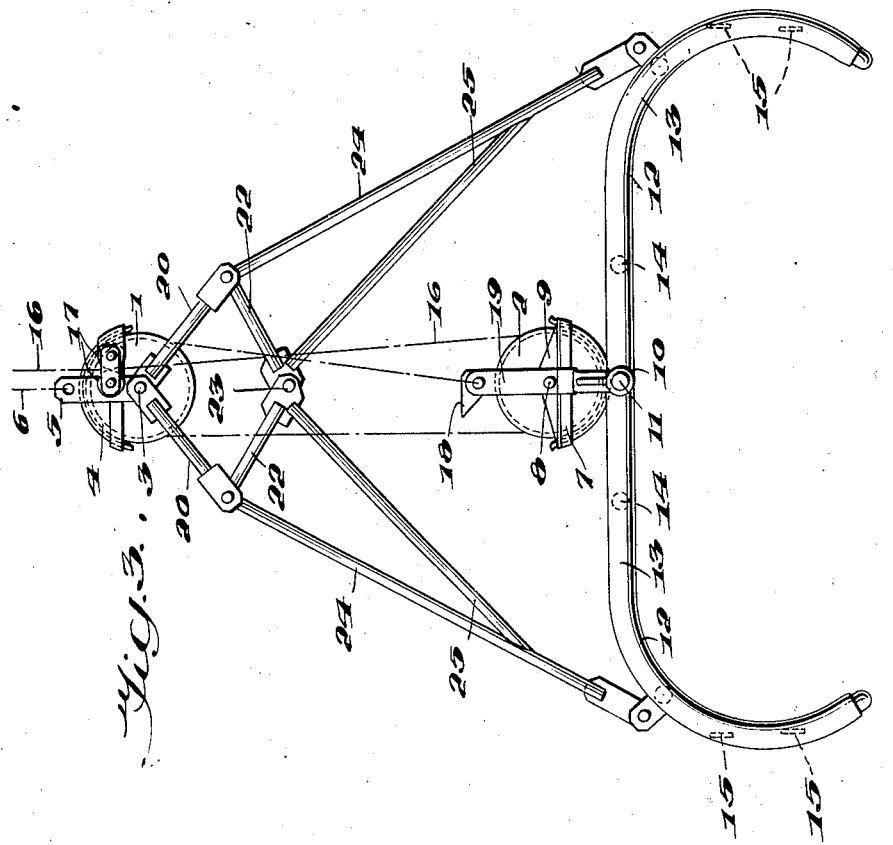
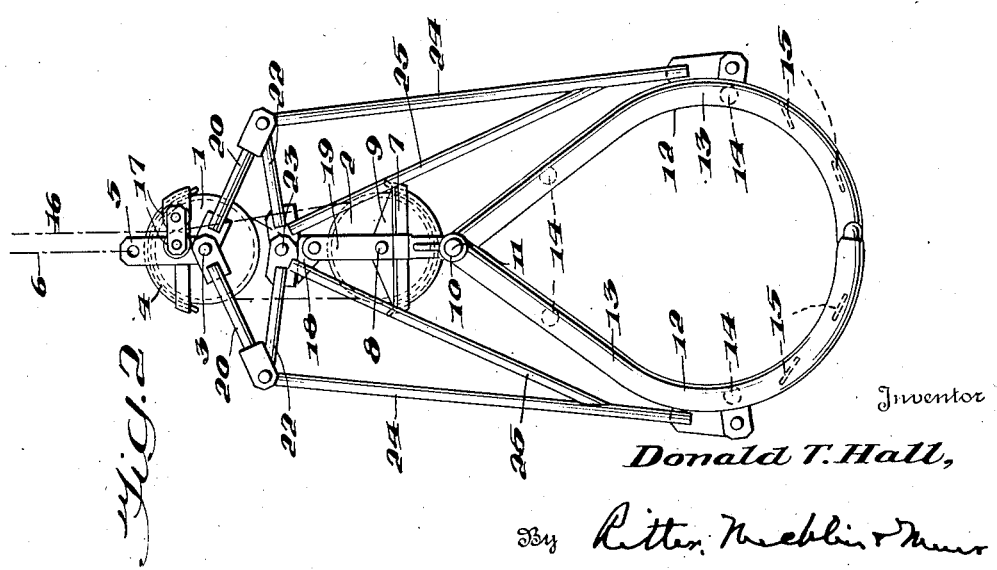
Inventor
Donald T. Hall,
By Ritter, Mechlin & Munn
his Attorneys Patented Nov. 7, 1944

2,362,268

UNITED STATES PATENT OFFICE 2,362,268

GRAB DEVICE

Donald T. Hall, Hilo, Territory of Hawaii

Application June 19, 1944, Serial No. 541,045

9 Claims. (Cl. 294—107)

My invention relates to grabs and its principal object is to provide a grab which will close and open quicker than those now in use and which will exert a greater force on the material which it handles.

The principal feature of the invention consists in providing a grab having pulleys movable relatively to each other for opening and closing the material engaging prongs thereof with a toggle device pivotally connected to the support of the upper pulley and to the prongs.

Another feature of the invention consists in providing the toggle device which is operatively interposed between the relatively movable pulleys of the grab with a pair of links pivotally connected to the support for the upper pulley and with members connecting the outer ends of those links to the prongs of the grab, those members being pivotally connected together above the lower pulley.

Other features of the invention residing in advantageous forms, combinations and relations of parts will hereinafter appear and be pointed out in the claims.

In the drawings,

Figure 2 is a side elevational view of the grab in closed position.

Figure 3 is a side elevational view of the grab in open position.

Figure 1:
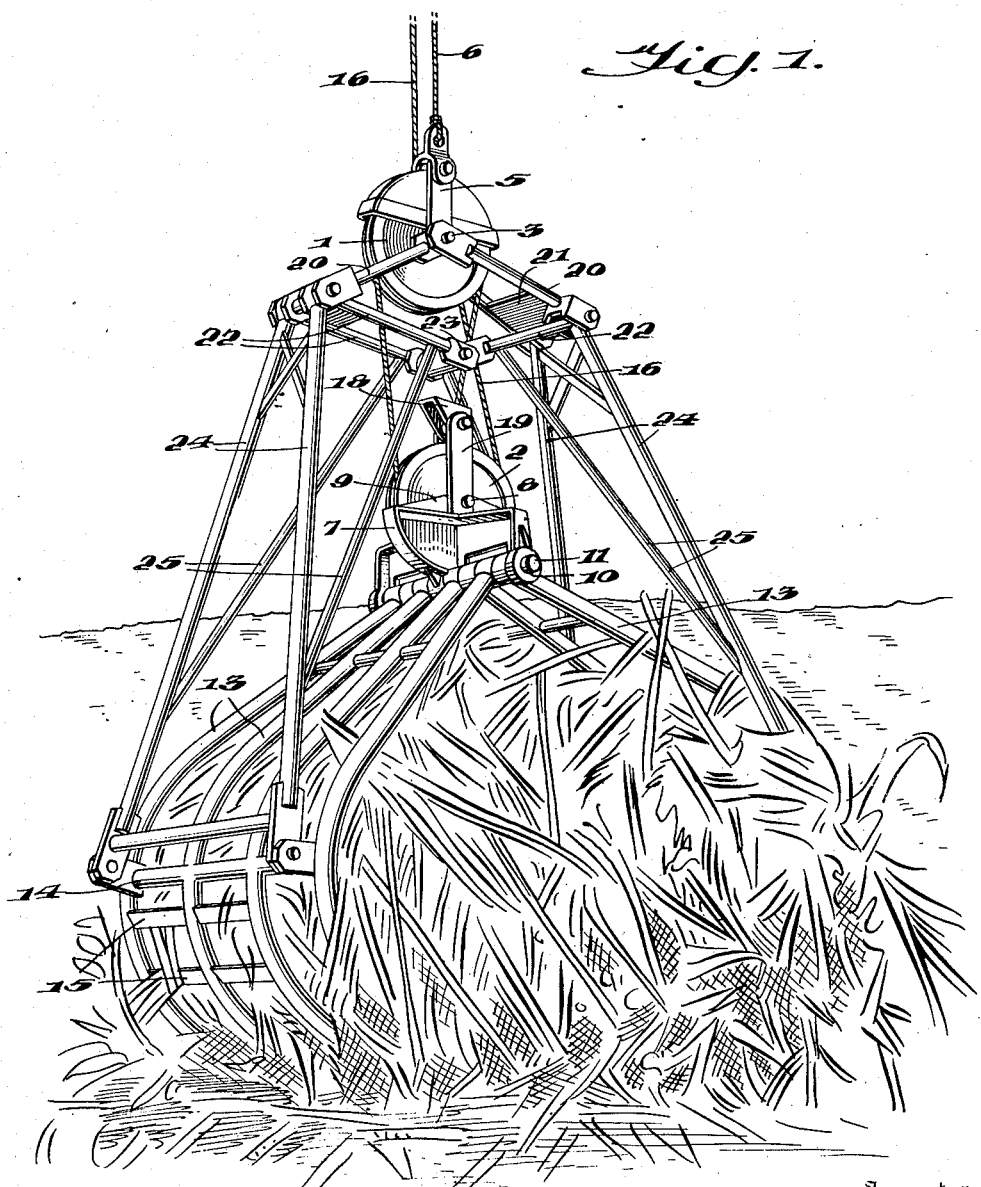
Figure 1 is a perspective view of the grab embodying my invention as it appears in operation, the material engaged by the grab being representative of sugar cane.

For purposes of illustration, the invention has been shown as applied to a grab which is primarily intended to handle sugar cane but it will, of course, be appreciated that it is equally well suitable for use with grabs intended to handle other material.

Referring more particular to the drawings, 1 indicates the upper pulley of the grab and 2 the lower pulley thereof. The upper pulley is mounted on a pin or axle 3 which may or may not, as desired, extend through the lower portion of a housing or the like indicated at 4 for enclosing the upper portion of the pulley. Connected to the pin 3 are a pair of links 5 by which the grab is connected in any suitable manner to a cable, chain or other suitable flexible means 6 for raising the grab.

The lower pulley 2 may be conveniently mounted in a casting or the like 7 on a pin or shaft 8 extending through some convenient portion of the casting, such as the upstanding walls 9 thereof. The casting 7 has hub portions 10 in which a shaft or axle 11 is mounted which may serve as a convenient pivotal support for the two sets 12 of the material handling prongs.

In the present embodiment of the invention, each set of prongs is shown as consisting of four laterally spaced tubular members 13 which are connected at suitable points by transverse tubular members 14. These transverse members along with additional plate-like ones 15 near the free ends of the prongs serve to prevent material, such as sugar cane, from dropping through the spaces between the main tubular members 13. Adjacent their upper ends these main tubular members converge and the upper ends of those of one set are interleaved or alternate with the upper ends of those of the other set on the shaft 11.

An additional cable, chain or other flexible means 16 is employed for moving the lower pulley toward the upper pulley. This cable preferably passes between two guide rollers 17 which may be carried by the housing 4 of the upper roller. After passing through the guide rollers 17, the cable passes around the lower half of the lower pulley, then around the upper half of the upper pulley and from there it extends downwardly so that its lower end may be secured to means connected with some portion of the casting 7 of the lower pulley or to the pin 8 by which the lower pulley is rotatably mounted in the casting. In the present embodiment of the invention, this means consists of a yoke or U-shaped member 18 which is connected by links 19 to the casting 7.

To cause the prongs to close when their upper ends are moved upwardly with the lower pulley 2 by the cable 16, a toggle device is employed. In the present embodiment of the invention, the toggle device comprises a pair of links 20 which are pivotally connected to some part of the support of the upper pulley and which diverge downwardly on opposite sides of a vertical plane passing through the axis of the pulley. The upper ends of the links are shown in the drawings as being pivotally connected to the pin or axle 3 of the upper pulley. Each link preferably has laterally spaced portions arranged on opposite sides of the upper pulley and rigidly connected at their lower ends by a plate or the like 21.

Pivotally connected to the outer ends of links 20 and extending inwardly therefrom are arms 22. These arms are pivotally connected at their inner ends by a pin 23. Also pivotally connected to the outer ends of the links 20 are downwardly extending members 24 whose lower ends are pivotally connected to the adjacent set of prongs at a desired point intermediate the length of the prongs. The lower ends of members 24 may be advantageously connected to the inner ends of arms 22 by strut members 25. In the present embodiment of the invention, the arms 22, members 24 and struts 25 on each side of the grab are rigidly joined but it is, of course, evident that what they accomplish may be obtained if they were merely pinned together.

During movement of the grab from open position shown in Figure 3 to closed position shown in Figure 2, the toggle device is caused to operate in such manner that the distance between the outer ends of the links 20 progressively increases. Greater leverage is, therefore, afforded during the end of the closing movement of the prongs when it is required than at the beginning of the closing movement. In addition to this action of the toggle device, the grab is caused to both open and close quicker than in other grabs.

Various modifications in structural details of the parts of the grab here illustrated and described may be made without departing from the scope of the invention as defined in the appended claims.

What I claim is:

1. A grab device having upper and lower pulleys, supports for said pulleys, two sets of grab prongs pivotally associated with the support of the lower pulley, means operatively connecting said pulleys for moving them toward each other, and a toggle device pivotally connected to the support of the upper pulley and having means pivotally connected to said sets of prongs for causing the prongs to close as the pulleys are moved toward each other.

2. A grab device having upper and lower pulleys, supports for said pulleys, two sets of grab prongs pivotally associated with the support of the lower pulley, means operatively connecting said pulleys for moving them toward each other, and a toggle device for closing said prongs as the pulleys move toward each other, said toggle device including a pair of links pivotally connected with the support of the upper pulley, and relatively movable means pivotally connecting the other ends of said links to said sets of prongs, said last named means being pivotally connected together above said lower pulleys.

3. A grab device having upper and lower pulleys, supports for said pulleys, two sets of grab prongs pivotally associated with the support of the lower pulley, means operatively connecting said pulleys for moving them toward each other, and a toggle device for closing said prongs as the pulleys move toward each other, said device including a pair of links pivotally connected with the support of the upper pulley, a pair of arms pivotally connected together at one end and pivotally connected to the outer ends of said links adjacent their opposite ends, and means pivotally connected with each set of prongs for causing the connected ends of said arms to move upwardly as the prongs are closed.

4. A grab device having upper and lower pulleys, supports for said pulleys, two sets of grab prongs pivotally associated with the support of the lower pulley, means operatively connecting said pulleys for moving them toward each other, and a toggle device for closing said prongs as the pulleys move toward each other, a pair of links pivotally connected to the support of the upper pulley diverging downwardly on opposite sides of a plane passing through the axis of the upper pulley, jointed means connecting the lower ends of said links, and means pivotally connecting the lower end of each link with one of said sets of prongs, said means being connected with said jointed means so that the distance between the lower ends of said links increases as the prongs are being closed.

5. A grab device having upper and lower pulleys, supports for said pulleys, two sets of grab prongs pivotally associated with the support of the lower pulley, means operatively connecting said pulleys for moving them toward each other, and a toggle device for closing said prongs as the pulleys move toward each other, said device including a pair of links pivotally connected to the support of the upper pulley diverging downwardly on opposite sides of a plane passing through the axis of the upper pulley, means pivotally connecting the lower end of each link to one of said sets of prongs, said last named means being pivotally connected together above the lower pulley.

6. A grab device having upper and lower pulleys, supports for said pulleys, two sets of grab prongs pivotally associated with the support of the lower pulley, means operatively connecting said pulleys for moving them toward each other, and a toggle device for closing said prongs as the pulleys move toward each other, said device including a pair of links pivotally connected to the support of the upper pulley and diverging downwardly therefrom, jointed means pivotally connecting the lower ends of said links, and means pivotally connecting the lower end of each link with one of said sets of prongs, said last named means being connected to said jointed means to cause the distance between the outer end of said links to increase as the prongs are closed.

7. A grab device having upper and lower pulleys, supports for said pulleys, two sets of grab prongs pivotally associated with the support of the lower pulley, means operatively connecting said pulleys for moving them toward each other, a pair of links pivotally connected to the support for the upper pulley and diverging downwardly therefrom, a plurality of rigid means pivotally connecting the outer end of said links to said prongs, each of said rigid means having an arm extending inwardly from adjacent its upper end and a strut extending upwardly from adjacent its lower end and connected to the arm thereof, the inner ends of said arms being pivotally connected above the lower pulley.

8. A grab having a pulley, a support for said pulley, a pair of pivotally connected material handling prongs, means for moving the pivotal connection of the prongs toward said pulley, and a toggle device for causing the prongs to close as their pivotal connection is moved toward said pulley, said device including downwardly diverging links pivotally connected to the support of said pulley, and means movably connecting the lower ends of said links to said prongs whereby the distance between said lower ends of the links is caused to increase during closing movement of the prongs.

9. A grab having a pulley, a support for said pulley, a pair of pivotally connected material handling prongs, means for moving the pivotal connection of the prongs toward said pulley, and a toggle device for causing the prongs to close as their pivotal connection is moved toward said pulley, said device including downwardly diverging links pivotally connected to the support of said pulley, pivotally connected arms extending inwardly and downwardly from the lower ends of said links, said arms being pivotally connected above said prongs and rigid means respectively connecting the lower ends of said links with said prongs.

DONALD T. HALL.